No. 628,514. Patented July 11, 1899.
W. F. ZIMMERMANN.
ELECTRIC VEHICLE.
(Application filed May 12, 1899.)

(No Model.)

Witnesses:
Raphaël Netter
J. H. Jones

Inventor
William F. Zimmermann
by Charles A. Terry — Att'y.

THE NORRIS PETERS CO., PHOTO-LITHO., WASHINGTON, D. C.

UNITED STATES PATENT OFFICE.

WILLIAM F. ZIMMERMANN, OF EAST ORANGE, NEW JERSEY.

ELECTRIC VEHICLE.

SPECIFICATION forming part of Letters Patent No. 628,514, dated July 11, 1899.

Application filed May 12, 1899. Serial No. 716,500. (No model.)

*To all whom it may concern:*

Be it known that I, WILLIAM F. ZIMMERMANN, a citizen of the United States of America, and a resident of East Orange, in the county of Essex and State of New Jersey, have invented certain new and useful Improvements in Electric Vehicles, of which the following is a specification.

My invention relates to the class of apparatus employed for propelling road-vehicles by electricity.

The object of the invention is to provide a convenient and economical propelling apparatus which may be used in connection with different vehicles, as occasion may require.

Heretofore it has been customary to equip a vehicle with an electric propelling device which is incorporated within and becomes a part of the vehicle itself.

The general purpose of my invention is to provide a propelling device which is separable from the vehicle and adapted to be transferred from one vehicle to another, as occasion may require.

The invention involves further special constructions of apparatus and means for securing the proper amount of traction and other details, which will be more fully pointed out hereinafter.

Figure 1:
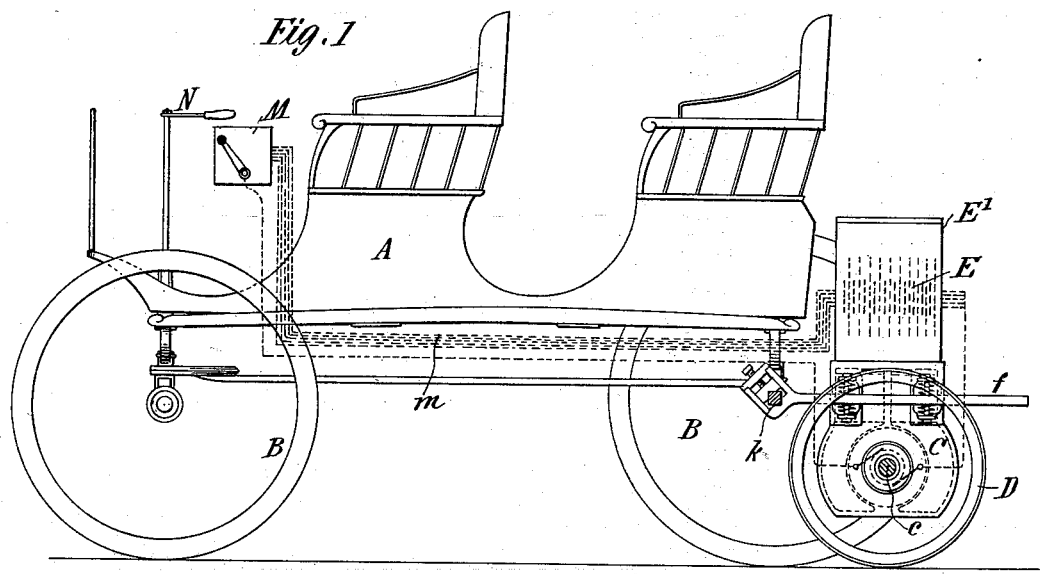
Figure 2:
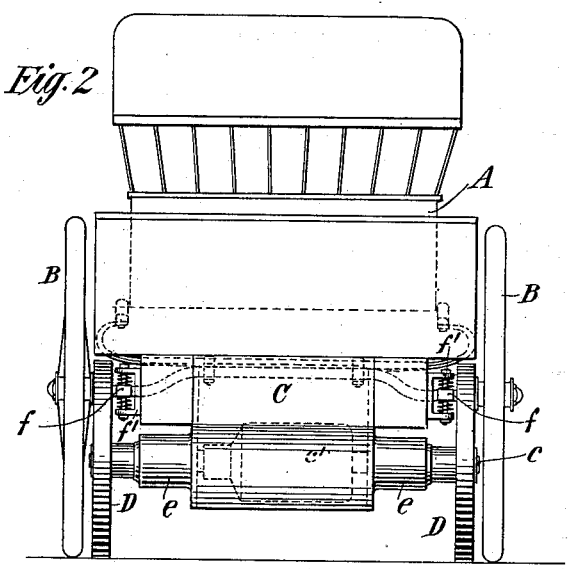

In the accompanying drawings, Figure 1 is a side elevation of a vehicle and a propelling device temporarily attached thereto. Fig. 2 is an end view thereof. Figs. 3, 4, 5, and 6 illustrate details.

Referring to the drawings, A represents the body of a vehicle of any suitable character, and B B represent the supporting-wheels thereof. The propelling device consists of an electric motor C of any suitable character, mounted upon the axle $c$ of the traction-wheels D. These traction-wheels are constructed in any suitable manner to afford the necessary friction with the ground. A storage battery or other suitable source of electric current E is carried within a suitable compartment E'. In the drawings I have shown the field-magnet $c'$ of the electric motor as being carried by boxes $e$ and the compartment E as supported upon the field-magnets. Various modifications in the method of supporting these several parts may be employed without departing from the spirit of my invention.

Figures 3, 4:
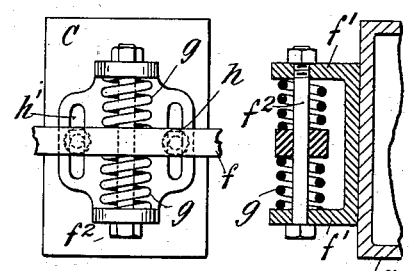
Figure 5:
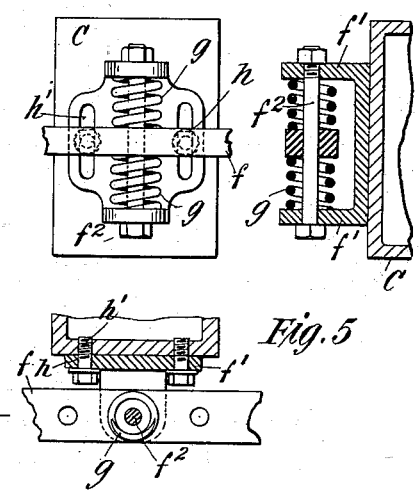
Figure 6:
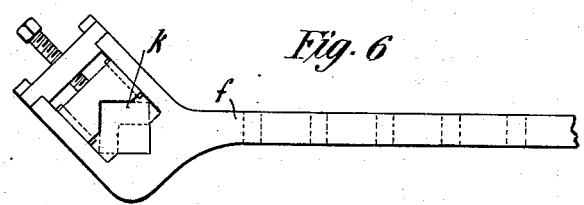

For the purpose of conveniently attaching and removing the propelling device coupling-bars $f$ may be employed. These are shown as being carried by lugs $f'$, secured to the sides of the field-magnet, and bolts $f^2$ pass through the rods and through the lugs. For conveniently adjusting the distance of the propelling device from the vehicle the bars $f$ are provided with additional holes, as shown in dotted lines in Fig. 6. In the drawings I have shown cushioning-springs $g$ above and below the bars $f$ for the purpose of permitting a relative movement on the part of the vehicle and the propelling device. Vertical adjustment of the bars $f$ may be had by means of the slots $h$, as shown in Fig. 3, the bolts $h'$ passing through these slots and fastening the lugs $f'$ to the field-magnet, so that the extensions themselves may be adjusted.

The bars $f$ are coupled to the rear axle of the vehicle by any suitable form of clamp—such, for instance, as is shown in the drawings at $k$—and they may be readily removed when it is desired to use the propelling device in connection with another vehicle. The form and structure of the clamp may be modified according to requirements of different vehicles.

The length of the axle $c$ is usually such that the traction-wheels D may pass within the tread of the rear wheels of the vehicle. This makes it possible to bring the propelling device in close proximity to the vehicle. The weight of the storage battery and the motor being carried almost entirely by the traction-wheels D, the necessary traction will be obtained.

For the purpose of controlling the operation of the motor a suitable controller M, of any suitable well-known character, is carried at some convenient position upon the vehicle itself, and conductors $m$, as indicated in the dotted lines, lead to the storage battery E. The vehicle itself is guided by means of a lever N and connecting-rods in a manner well understood in the art. The conductors $m$ may be included in a single cable and may be adapted to be connected or disconnected, as required, in a manner well understood.

Any of the usual well-known methods of connecting the wheels D with the axle c for the purpose of permitting such independent movement of the wheels as may be desirable in turning corners may be employed.

I claim as my invention—

1. The combination with a vehicle, of a detachable electric propelling device comprising an electric motor, a source of current and a single axle and its traction-wheels carrying the same.

2. The combination with a vehicle, of an electric propelling device therefor comprising a single axle and its supporting-wheels and an electric motor carried thereby and separately attached to the vehicle.

3. The combination of an electric motor and storage battery, a supporting-axle for said motor and battery and a coupling device for connecting the same with the vehicle.

4. The combination of a vehicle and an electric propelling device therefor, supported independently of the vehicle itself and means for separately attaching the same to the rear axle of the vehicle.

5. An electric propelling device for use with different vehicles, comprising a driving-motor, traction-wheels, an axle therefor supporting the motor, and an adjustable removable coupling device for connecting the propelling device with different vehicles.

6. A motor-carriage operated by an electric motor and supplied with two additional wheels supporting the weight of the motor and the source of electric current.

7. A motor-carriage operated by an electric motor and supplied with two additional wheels supporting the weight of the motor and the source of electric current and means for controlling the operation of the motor carried by the vehicle, said additional wheels and motor being separable from the vehicle itself.

Signed by me, at New York city, New York, this 10th day of May, 1899.

WM. F. ZIMMERMANN.

Witnesses:
J. H. JONES,
M. V. GRACE.